United States Patent
Kaipainen et al.

(10) Patent No.: US 7,433,339 B2
(45) Date of Patent: Oct. 7, 2008

(54) DATA TRANSMISSION METHOD AND EQUIPMENT

(75) Inventors: Yrjö Kaipainen, Espoo (FI); Olav Tirkkonen, Helsinki (FI); Markku Kuusela, Helsinki (FI)

(73) Assignee: Nokia Corporation, Espoo (FI)

( * ) Notice: Subject to any disclaimer, the term of this patent is extended or adjusted under 35 U.S.C. 154(b) by 885 days.

(21) Appl. No.: 10/475,834

(22) PCT Filed: Apr. 25, 2002

(86) PCT No.: PCT/FI02/00350

§ 371 (c)(1),
(2), (4) Date: Oct. 24, 2003

(87) PCT Pub. No.: WO02/089358

PCT Pub. Date: Nov. 7, 2002

(65) Prior Publication Data

US 2004/0160921 A1    Aug. 19, 2004

(30) Foreign Application Priority Data

Apr. 26, 2001    (FI) .................... 20010874

(51) Int. Cl.
  H04B 7/216    (2006.01)
(52) U.S. Cl. .............. 370/335; 370/334; 370/342; 370/491
(58) Field of Classification Search ................ 370/329, 370/334, 341, 342, 491, 500; 455/360, 562.1; 710/112, 113
See application file for complete search history.

(56) References Cited

U.S. PATENT DOCUMENTS 6,393,506 B1 *    5/2002    Kenny .................. 710/113
6,748,024 B2 *    6/2004    Kuchi et al. .............. 375/299
6,754,473 B1 *    6/2004    Choi et al. ................ 455/101
6,757,755 B2 *    6/2004    Askar et al. ............... 710/52

(Continued)

FOREIGN PATENT DOCUMENTS

| EP | 1 065 800 A1 | 1/2001 |
| EP | 1065800 A1 | 1/2001 |
| WO | WO 02/17512 | 2/2002 |
| WO | WO 02/17512 A1 | 2/2002 |

OTHER PUBLICATIONS

"Performance of downlink eigenbeamformer with realistic feedback transmission", Seeger et al, In: Vehicular Technology Conference, 2001. VTC 2001 Fall, IEEE VTS 54th, on pp. 1269-1273 vol. 3, Oct. 7-11, 2001.

(Continued)

Primary Examiner—Moe Aung
Assistant Examiner—Haile Awet
(74) Attorney, Agent, or Firm—Squire, Sanders & Dempsey, L.L.P.

(57) ABSTRACT

Equipment for transmitting a signal, the equipment comprising an antenna array (600-606) for providing three or more radiation antenna patterns. The equipment is arranged to transmit a primary common pilot signal with at most two radiation patterns and a secondary common pilot signal with at least one radiation pattern. The equipment comprises controllers (622a-622d) for adjusting the power ratio between the primary and the secondary common pilot signal and the total power of the primary and the secondary common pilot signals, and controllers (614a-614d) for adjusting the transmit power of the dedicated pilot signal, such that the power levels of the dedicated pilot signals transmitted with the same radiation patterns as the secondary common pilot signal are relatively higher than the power levels of the dedicated pilot signals transmitted with the same radiation patterns as the primary common pilots.

26 Claims, 9 Drawing Sheets

U.S. PATENT DOCUMENTS

| | | | |
|---|---|---|---|
| 6,757,768 B1* | 6/2004 | Potter et al. | 710/112 |
| 6,915,371 B1* | 7/2005 | Berndt et al. | 710/310 |
| 7,194,022 B2* | 3/2007 | Honkanen et al. | 375/216 |
| 2001/0006531 A1* | 7/2001 | Okuyama | 375/130 |
| 2002/0044591 A1* | 4/2002 | Lee et al. | 375/130 |
| 2004/0132494 A1* | 7/2004 | Tirkkonen et al. | 455/562.1 |
| 2004/0172493 A1* | 9/2004 | Askar | 710/305 |

OTHER PUBLICATIONS

G.J. Foschini: "Layered-Space Time Architecture for Wireless Communication in a Fading Environment When Using Multi-Element Antennas", Bell Labs Technical Journal, Autumn 1996, pp. 41-59.

Seegar A. et al. "Performance of Downlink Eigenbeamformer with Realistic Feedback Transmission", Vehicular Technology Conference, 2001, VTC 2001 Fall, IEEE VTS 54th, pp. 1269-1273, vol. 3, 7-11, Oct. 2001.

* cited by examiner

DATA TRANSMISSION METHOD AND EQUIPMENT

FIELD OF THE INVENTION

The invention relates to a data transmission method used particularly in connection with transmit diversity. The invention further relates to equipment that is suitable for transmitting a signal and to equipment suitable for receiving a signal.

BACKGROUND OF THE INVENTION

As well known, the transmission path used for transmitting signals in telecommunication connections causes interference to telecommunications. This occurs irrespective of the physical form of the transmission path, i.e. whether the transmission path is a radio connection, an optical fibre or a copper cable, for instance. Particularly in radio communications, situations often occur where the quality of the transmission path varies from one connection to another and also during a connection.

Fading on a radio path is a typical phenomenon causing changes in a transmission channel. Other simultaneous connections may also cause interference, which may change as a function of time and place.

In a typical radio communication environment, signals between a transmitter and a receiver propagate along several paths. This multipath propagation is mainly caused by the signal being reflected from surrounding surfaces. Signals that have propagated along different paths arrive at the receiver at different times due to different propagation delays. Different methods have been developed to compensate for the fading caused by the multipath propagation.

A solution to the problem is to use diversity in the transmitter. In time diversity, interleaving and encoding are used to achieve time-based diversity in the signal to be transmitted. However, a drawback is delays in transmission, especially when the channel is a slowly fading one. In frequency diversity, in turn, the signal is transmitted simultaneously at several frequencies. However, this is an inefficient method when the channel has a wide coherence bandwidth.

In antenna diversity, a signal is transmitted and/or received by means of more than one antenna. Hereby the signal components that have multipath-propagated via different channels will probably not be interfered with by a simultaneous fade. In reception diversity, the transmitted signal is received by two or more antennas with different locations. A drawback of reception diversity is the difficulty of implementing two antennas in a terminal equipment that should be as small as possible. Transmit diversity includes transmitting the same signal to the receiver by means of two or more different antennas. The receiver combines the signals for example by means of the MLSE (Maximum Likelihood Sequence Estimator) or the MMSE (Minimum Mean Square Error) methods. In downlink communication in mobile telephone systems, transmit diversity is more applicable than reception diversity, since it is easier to set up several antennas in a base station than in a terminal equipment.

The cellular radio systems that are currently under development, such as UMTS, also provide the possibility of using two transmit antennas. An example of such systems is the UMTS standard version Release 99. However, the use of even more antennas, such as four antennas, for transmit diversity is also being developed. Such methods will possibly be provided in subsequent UMTS standard versions. In transmit diversity according to the Release 99 version, each channel is transmitted with two radiation patterns.

A particular feature of transmit diversity is the required transmission of pilot signals, i.e. typically one additional pilot for each additional diversity. Pilot signals are particularly used in base station transmission in CDMA systems. There are various types of pilot signals. Firstly, there are common pilots, which are intended for all the terminal equipments collectively. Secondly, there are dedicated pilots, which are included in the transmission of one user signal. Common pilot signals are used in the terminal equipment for forming a channel estimate for a dedicated channel. Similarly, several other measurements are also carried out on a common pilot signal, such as handover, synchronization and idle mode cell selection measurements. If a terminal equipment does not have a dedicated channel, the channel estimate is formed entirely based on the common pilot There can be further two types of common pilot signals, i.e. primary and secondary common pilots. A primary common pilot is transmitted with an omnidirectional radiation pattern in the cell, such that the pilot can be received by all the terminal equipments in the cell. A primary common pilot is typically transmitted at a power level that constitutes a significant proportion (e.g. 10%) of the entire base station transmit power. A primary common pilot is transmitted by means of a particular channelization code and a scrambling code. The use of a primary common pilot is significant in measurements related to handover and cell selection. There can be several secondary common pilots in the cell area, and they are transmitted e.g. with beam-shaped radiation patterns to areas with congestion, for instance. A secondary common pilot is transmitted by means of a channelization code of a particular length (256), but the code itself can be selected freely.

In the case of one transmit antenna one primary common pilot is transmitted. For example in the UMTS, the pilot symbol sequence is then of the form AAAA, where $A=1+j$.

In the case of two-antenna transmit diversity, a primary common pilot is transmitted at the same power level from each antenna. The pilot symbol sequence in one antenna is thus of the form AAAA and in the other antenna A-A-AA. The channelization code and the scrambling code are the same.

It is possible to introduce into the market such terminal equipments that are capable of receiving base station transmissions utilizing transmit diversity of at most two antennas. Such equipments include terminal equipments according to the UMTS Release 99 version. When the diversity technique is further developed in order to utilize more than two antennas, it should be ensured that terminal equipments capable of receiving transmissions transmitted via only two transmission routes receive high-quality service, whereas terminal equipments that are capable of receiving a signal transmitted over more than two transmission routes will be able to utilize transmit diversity to the maximum. Particularly transmission of pilot signals is problematic since primary pilot signals can only be transmitted via two transmission routes.

A prior art arrangement for transmitting pilot signals in connection with four antennas is to transmit a primary common pilot signal via two antennas and a secondary common pilot via two other antennas, all the transmissions taking place at the same power level:

| Transmit antenna | Pilot sequence | Signal |
|---|---|---|
| 1 | AA | Primary |
| 2 | A-A/-AA | Primary |
| 3 | AA | Secondary |
| 4 | A-A/-AA | Secondary |

A drawback of this method is that the terminal equipments capable of receiving a signal transmitted with only two antennas lose some of the pilot signal power. This creates problems for the terminal equipments since the measurements to be carried out on the pilot (for handover and cell selection) will become more difficult as the power of the pilot signal decreases. Furthermore, this method cannot be applied to more than four transmit antennas without adding new channelization codes.

BRIEF DESCRIPTION OF THE INVENTION

An objective of the invention is to provide a method and equipment implementing the method so as to eliminate the aforementioned problems. The invention relates to a data transmission method where a signal is transmitted from a transmitter by means of three or more radiation patterns, the method comprising transmitting a primary common pilot signal by means of at most two radiation patterns and a secondary common pilot signal by means of at least one radiation pattern by adjusting the power ratio between the primary common pilot signal and the secondary common pilot signal and the total power of the primary and the secondary common pilot signal, transmitting a dedicated pilot signal with at least one user signal with adjustable transmit power, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals, and using the dedicated pilot signals transmitted with the same radiation patterns as the secondary common pilot signal for channel estimation measurements in the receiver.

The invention also relates to a data transmission method where a signal is transmitted from a transmitter by means of three or more radiation patterns, the method comprising transmitting a primary common pilot signal by means of at most two radiation patterns and a secondary common pilot signal by means of at least one radiation pattern by adjusting both the power ratio between the primary and the secondary common pilot signal and the total power of the primary and the secondary common pilot signal, transmitting a dedicated pilot signal with at least one user signal with adjustable transmit power, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals, and carrying out general measurements related to wireless communication, excluding channel estimation of the radiation patterns corresponding to the non-primary common pilot channels, by means of the primary common pilot channels or the primary common pilot channels and the corresponding dedicated channels.

The invention also relates to equipment for transmitting a signal, the equipment comprising an antenna array providing three or more radiation antenna patterns, means for transmitting a primary common pilot signal with at most two radiation patterns, means for transmitting a secondary common pilot signal with at least one radiation pattern, means for adjusting both the power ratio between the primary and the secondary common pilot signal and the total power of the common pilot signals, means for adjusting the transmit power of the dedicated pilot signal transmitted with each user signal, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals.

The invention further relates to equipment for receiving a signal comprising a primary and a secondary common pilot signal and a dedicated pilot signal, the equipment comprising one or more antennas for receiving a signal from a transmitter, means for determining the power level of the received common pilot signals and the power level of the received dedicated pilot signal, and means for subjecting the received signal to channel estimation, means for guiding the channel estimation means to perform estimation on the dedicated pilot signal and the secondary pilot signal during reception of a signal including a weak secondary common pilot signal and a strong dedicated pilot signal.

In preferred embodiments of the invention, a signal is transmitted by means of three or more transmit antennas or, alternatively, by means of three or more beams provided by several transmit antennas. In the preferred embodiments of the invention, a primary common pilot signal is transmitted with two radiation patterns. Furthermore, a secondary common pilot signal is transmitted with at least one, typically two, radiation patterns. The power ratio between the primary and the secondary common pilot signal as well as the total power of the common pilots, is adjusted by a coefficient. The method of this adjustment can be selected by the system operator and it can be based for example on information about the terminal equipment types of the system users. In a typical situation where most of the user terminal equipments are only able to receive transmissions by at most two antennas, the power level of the secondary common pilot signals is considerably lower than the power level of the primary common pilots. On the other hand, the adjustment can also be dynamic, if desired.

In a preferred embodiment of the invention, secondary pilot signals are transmitted sequentially, i.e. with power levels that vary in time. This can be achieved e.g. by transmitting several secondary pilot signals to the same radiation pattern by means of using different channelization codes, such that the signals alternately strengthen and weaken one another. The advantage is that even though the average power level is the same, the signal-to-interference ratio is better since channel estimation can be centred on the instants when the pilot is strong. Furthermore, in the preferred embodiments of the invention a dedicated pilot signal is transmitted with at least one user signal at an adjustable transmit power level. The arrangements utilize a new type of asymmetrical channel estimate. In the signals that are transmitted with a strong primary common pilot, the power level of the dedicated pilot can be adjusted to a low level. In the signals transmitted with a weak secondary common pilot, the power level of the dedicated pilot is adjusted to a relatively higher value than in the signals transmitted with the primary pilot. In a preferred embodiment of the invention, an asymmetrical channel estimate is applied by favouring a signal comprising the primary common pilot. During transmission, the transmit antenna path proved to have a channel with a good channel estimate can be favoured by increasing the data transmit power thereof with respect to the other transmission routes.

In a preferred embodiment of the invention, the total power levels of the dedicated pilots are adjusted such that dedicated pilot signals are transmitted to different radiation patterns with possibly the same momentary power but for different periods of time. For example, a dedicated pilot is transmitted for a longer period of time to the radiation patterns that receive a weak secondary common pilot than to the radiation patterns receiving a primary pilot In order to maintain the receiver structure of the Release 99 standard version as closely as possible, in a preferred embodiment of the invention the general channel measurements required by the system (measurements other than channel estimation, i.e. for example SIR [signal-to-interference ratio], handover, idle mode cell selection and synchronization measurements and power adjustment control) are carried out asymmetrically so that the radiation pattern corresponding to the primary common pilot channel is favoured advantageously. In a preferred embodiment, the aforementioned measurements are carried out only on these radiation patterns.

The method and the equipment according to the invention provide several advantages. The arrangements according to the preferred embodiments of the invention ensure high pilot signal quality also for terminal equipments that are not capable of utilizing more than two transmit antennas in connection with transmit diversity. On the other hand, the terminal equipments that are able to do this can utilize transmit diversity as planned. During reception of a signal transmitted with a radio pattern including a secondary common pilot signal, channel estimation is possibly carried out based on both the dedicated pilot signal and the secondary common pilot signal. Furthermore, since the number of equipments utilising only a smaller degree of diversity will likely decrease in the future as the users exchange their equipments for the latest models, in preferred embodiments of the invention the weighting of the pilot signals can be changed so as to favour more the terminal equipments that are capable of receiving transmissions transmitted with more than two antennas. The operator of the system will thus be better equipped to make the system operate more effectively.

BRIEF DESCRIPTION OF THE FIGURES

The invention will be described below in connection with the preferred embodiments and with reference to the accompanying drawings, in which.

DETAILED DESCRIPTION OF THE PREFERRED EMBODIMENTS

The invention can be applied in radio systems where at least a part of a signal can be transmitted with three or more transmit antennas or with three or more beams provided by several transmit antennas. A transmission channel can be formed by means of e.g. time division, frequency division or code division symbol multiplexing or multiple access method. Systems utilizing combinations of different multiple access methods are also covered by the scope of the invention. The examples illustrate the use of the invention in a universal mobile telecommunication system (UMTS) employing a wideband code division multiple access method (WCDMA) implemented with a direct sequence technique, without restricting the invention thereto, however.

Figure 1:
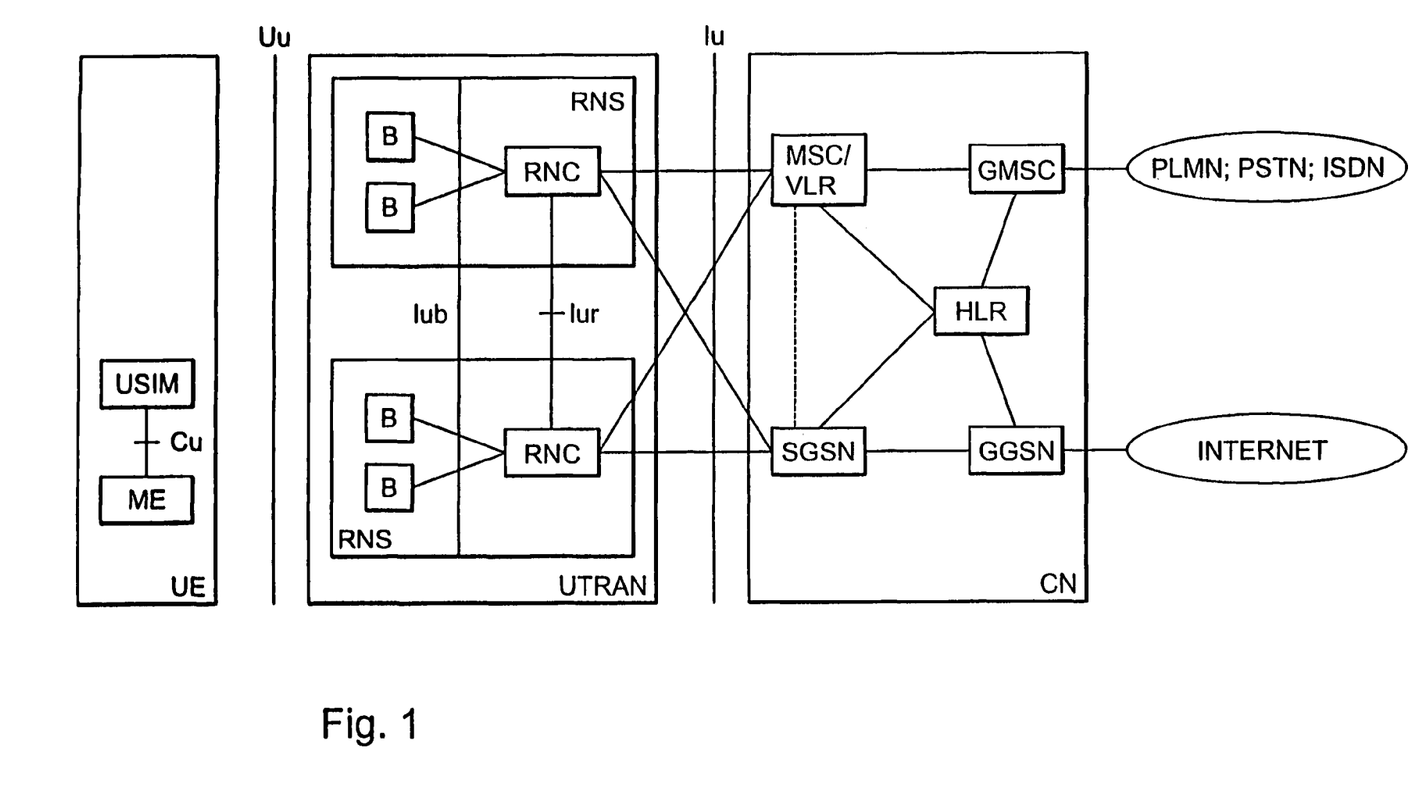
FIG. 1 shows an example of a system according to an embodiment of the invention.

With reference to FIG. 1, the structure of a mobile telephone system will be described by way of an example. The main components of a mobile telephone system include a core network CN, a UMTS terrestrial radio access network UTRAN and a user equipment UE. The interface between the CN and the UTRAN is referred to as an Iu interface, and the air interface between the UTRAN and the UE is referred to as a Uu interface.

The user equipment consists of two parts: a mobile equipment ME that comprises a radio terminal used to set up a radio connection over the Uu interface, and a UMTS subscriber identity module USIM that is a smart card containing data related to user identity and typically carrying out authentication algorithms and storing encryption parameters and subscriber data.

The UTRAN consists of radio network subsystems RNS, each of which in turn consists of a radio network controller RNC and one or more nodes B. Node B is in practice a base station. The RNC controls radio resources of base stations connected thereto.

The core network consists of several elements. A home location register HLR is a database in the subscriber's home system for updating a user service profile. The HLR also maintains data on user location with the accuracy of an MSC. A mobile services switching centre/visitor location register MSC/VLR is both a switch (MSC) and a database (VLR) servicing the terminal equipment with respect to circuit-switched (CS) services. The MSC switches circuit-switched services and the VLR maintains data on the user profile and location. A gateway MSC GMSC is in turn a switch connecting the UMTS to external services or networks. All circuit-switched connections are switched via the GMSC. The functionality of a serving GPRS (General Packet Radio Service) support node SGSN corresponds to the functionality of the MSC/VLR, but it forwards packet-switched (PS) connections. Correspondingly, the functionality of a gateway GPRS support node GGSN corresponds to the GMSC, but it forwards packet-switched connections. External networks can be divided into two types: circuit-switched networks, such as existing telephone networks, and packet-switched networks, such as the Internet.

The UTMS comprises several specified interfaces. A Cu interface is located between the USIM and the ME. A Uu interface is located between the terminal equipment and the base station. An interface between the CN and the UTRAN is called an Iu interface. An interface between RNSs is referred to as an Iur interface. This enables soft handovers between radio network controllers of different manufacturers. An interface between an RNC and a base station B is called an Iub interface.

Figure 2:
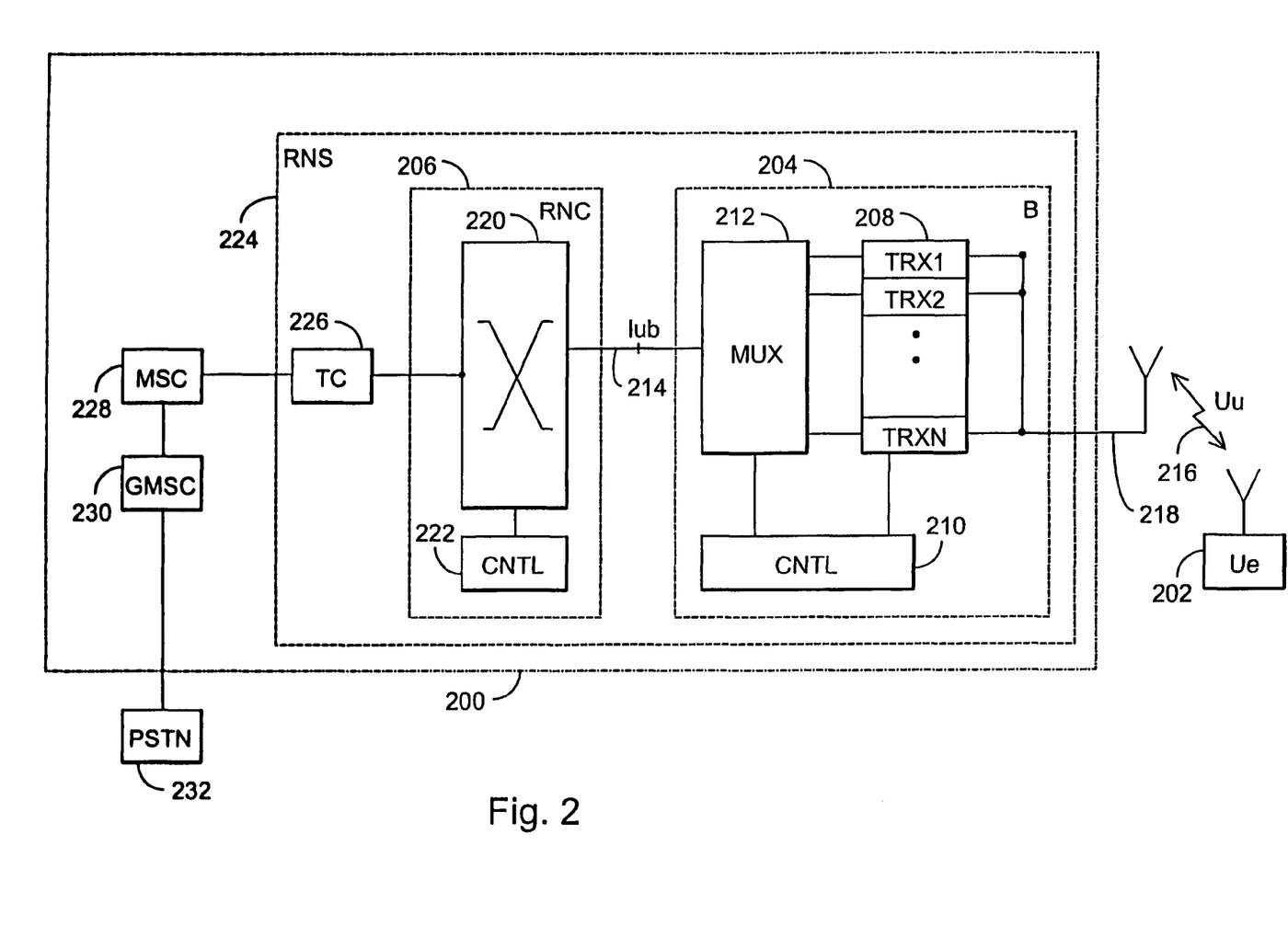
FIG. 2 shows another example of a system according to an embodiment of the invention.

FIG. 1 shows the structure in a rather general level, wherefore it will be illustrated in more detail in FIG. 2 by means of an example of a cellular radio system. FIG. 2 only shows the essential blocks, but it is evident for a person skilled in the art that a conventional cellular radio network also includes a number of other functions and structures, which do not have to be described in more detail herein. It should also be noted that FIG. 2 shows only an exemplary structure. The details of the systems according to the invention may differ from those shown in FIG. 2, but such differences are not significant for the invention.

Thus, a cellular radio network typically comprises a fixed network infrastructure, i.e. a network part 200 and terminal equipments 202, which can be fixed, located in a vehicle or portable. The network part 200 includes base stations 204. A base station corresponds to node B shown in FIG. 1. Several base stations 204 are controlled in a centralized manner by a radio network controller 206 communicating with them. A base station 204 comprises transceivers 208 and a multiplexer unit 212.

The base station 204 further comprises a control unit 210, which controls the operation of the transceivers 208 and the multiplexer 212. The multiplexer 212 is used to place the traffic and control channels used by several transceivers 208 to a common transmission link 214. The transmission link 214 forms an Iub interface.

The transceivers 208 of the base station 204 are connected to an antenna unit 218, which implements a bidirectional radio connection 216 to the terminal equipment 202. The structure of the frames to be transmitted over the bidirectional radio connection 216 is specified in each system, and it is referred to as an air interface Uu. In the preferred embodiments of the invention, at least a part of a signal is transmitted by means of three or more transmit antennas or three or more beams provided by several transmit antennas.

The radio network controller 206 comprises a group switching field 220 and a control unit 222. The group switching field 220 is used to switch speech and data and to connect signalling circuits. A radio network subsystem 224 formed by the base station 204 and the radio network controller 206 also includes a transcoder 226. The transcoder 226 is usually located as close to the mobile services switching centre 228 as possible, since speech can thus be transmitted in the cellular network format between the transcoder 226 and the radio network controller 206, thus saving transmission capacity.

The transcoder 226 transforms the different digital speech coding forms used between a public switched telephone network and the mobile telephone network to be compatible with one another, e.g. from the fixed network format to a cellular radio network format, and vice versa. The control unit 222 performs call control, mobility management, gathering of statistical data and signalling.

FIG. 2 further shows a mobile services switching centre (MSC) 228 and a gateway MSC 230, which attends to the connections from the mobile telephone system to the outside world, in this case to the public switched telephone network 232.

Figure 3:
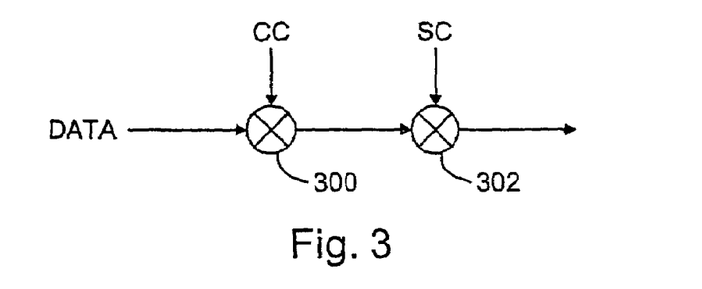
FIG. 3 shows an example of scrambling and channelization coding.

The scrambling and channelization coding used in the UMTS will be examined below as an example of coding a WCDMA signal. This is illustrated in FIG. 3. A signal to be transmitted from the transmitter is multiplied by a channelization code in a first multiplier 300 and by a scrambling code in a second multiplier 302. The scrambling code is used to distinguish from one another on the one hand the terminal equipments and on the other hand the base stations. The channelization code enables distinguishing between signals transmitted from the same transmitter.

Radio systems typically comprise two types of transmission channels, i.e. dedicated channels and common channels. A common channel is intended for all users or a group of users in a particular cell. Dedicated channels in turn are intended for only one user. A dedicated channel is identified by means of the frequency and the scrambling code used.

Examine below in more detail and by way of an example the pilot signals used in the UMTS. In the UMTS, the common pilot channel (CPICH) is an unmodulated code signal multiplied by a cell-specific scrambling code. The CPICH has a fixed data rate and spreading factor. The purpose of the signal is to assist the terminal equipment in the channel estimation of the dedicated channel and to provide the common channels with a channel estimation reference. There are thus two types of common pilots, i.e. primary and secondary, P-CPICH and S-CPICH. The difference is that a primary common pilot is transmitted to the entire cell area multiplied by a primary scrambling code and a fixed channelization code. On the other hand, a secondary common pilot can have a freely selectable channelization code, the length of which is 256 chips, and possibly a secondary scrambling code. A cell can comprise several secondary pilots, but on the other hand it is also possible not to transmit any secondary pilots if they are not needed. A secondary pilot is typically transmitted to congested sectors or areas with a large number of communicating terminal equipments.

Figure 4A:
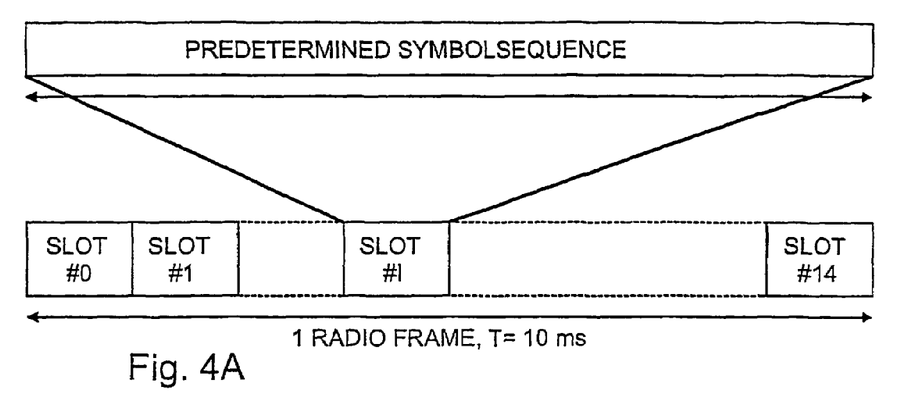
FIGS. 4A to 4C show examples of signal frame structures and transmission of pilot signals.
Figure 4B:
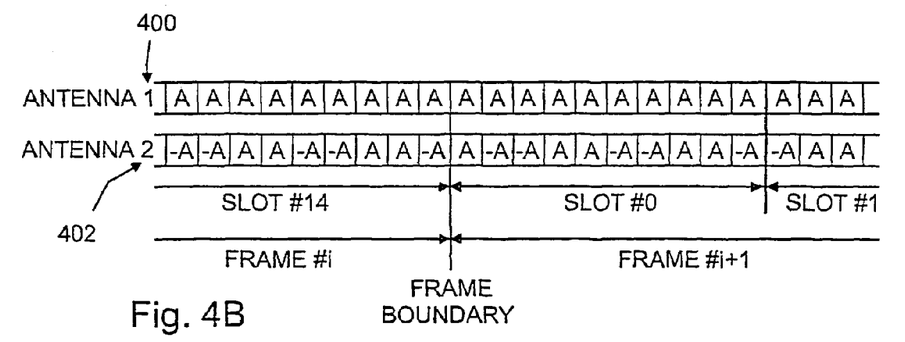

FIG. 4A illustrates the structure of a common pilot signal. The frame length is 10 ms and the frame comprises 15 time slots, each of which is used to transmit a predetermined symbol sequence. If transmit diversity is not used, the symbol sequence has a form denoted by reference numeral 400 shown in FIG. 4B, where A=1+j. If diversity with two antennas is used, the symbol sequence of the first antenna has the form denoted by 400 and the sequence of the second antenna has a form denoted by reference numeral 402. The signal of each antenna has the same channelization and scrambling code. When there are more than two antennas, the arrangement shown in FIG. 4B can no longer be applied as such.

Figure 4C:
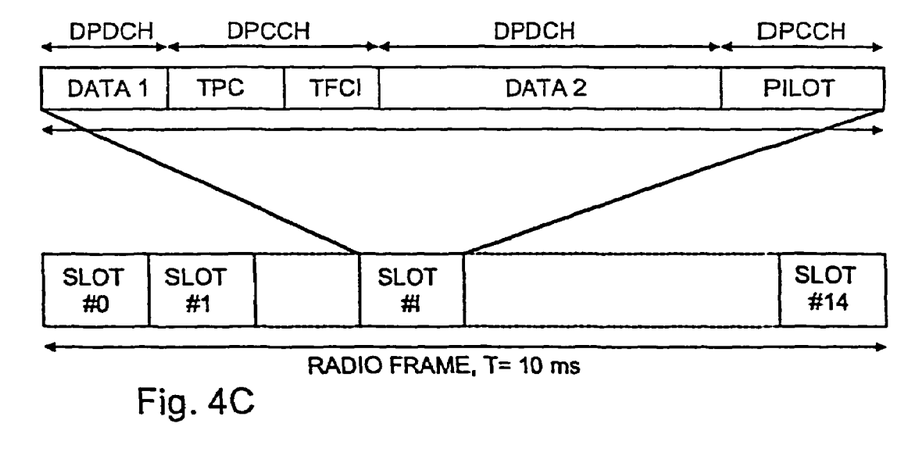

A dedicated pilot contained in the transmission of one user signal is also transmitted in the UMTS. A dedicated pilot is transmitted in both transmission directions. Dedicated pilot symbols are used for channel estimation. FIG. 4C illustrates an example of a downlink frame structure. The frame is 10 ms in length and includes 15 time slots. Each time slot comprises several fields, such as DATA (for transmission of actual information), TPC (symbols for power control), TFCI (information on the transfer rate used in the time slot) and PILOT (pilot signal symbols). The total number of the actual symbols depends on the spreading factor used, which may vary in the range of 4 to 256. The number of field-specific symbols in turn depends on the time slot format used. For example, the number of the pilot symbols can vary from 2 to 32.

Figure 5:
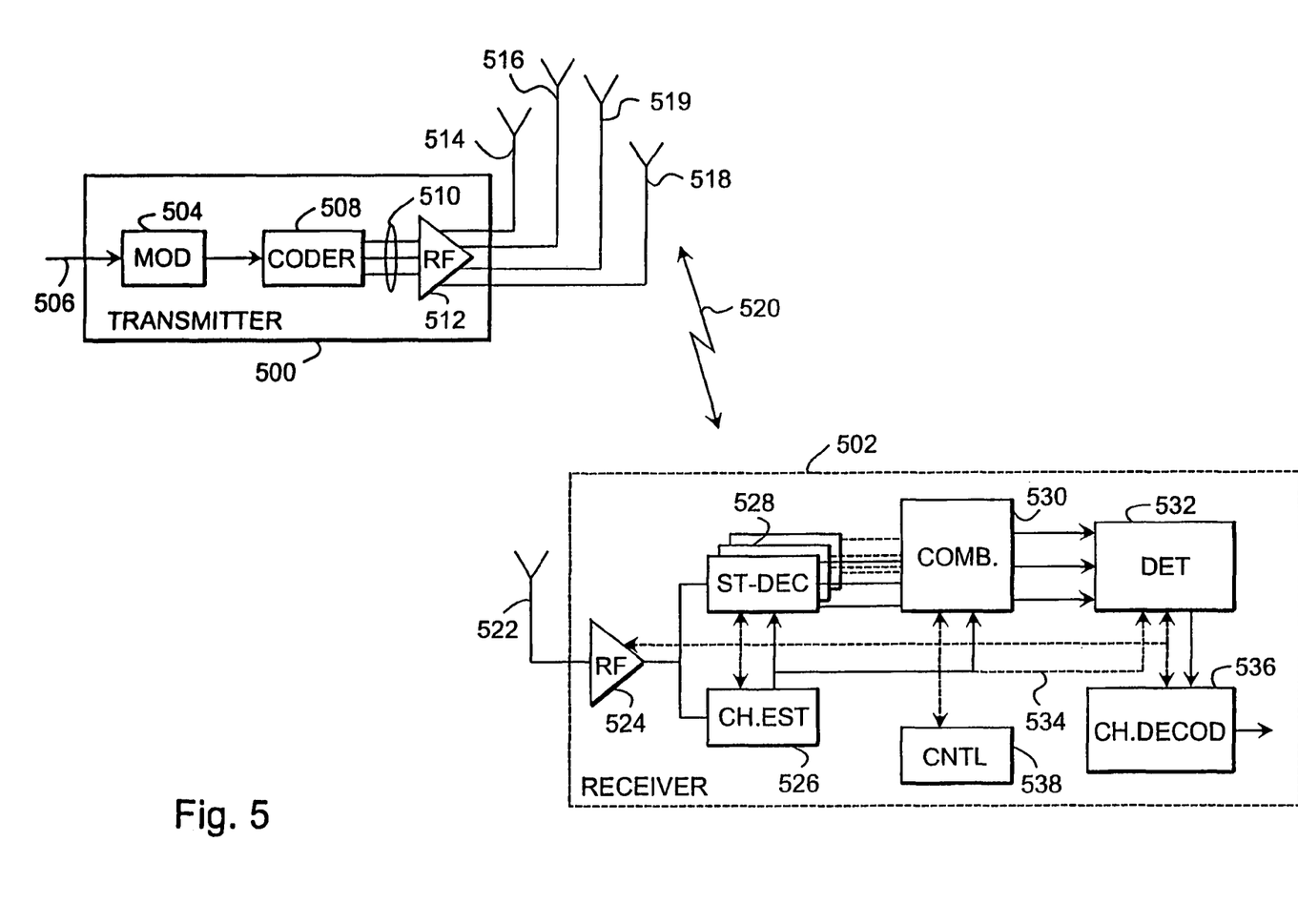
FIG. 5 illustrates an example of an arrangement according to an embodiment of the invention.

FIG. 5 illustrates an example of an arrangement according to an embodiment of the invention. The figure shows a situation where channel-coded symbols are transmitted via four antennas on different frequencies, in different time slots or by means of different scrambling codes. The figure shows first a transmitter 500, which communicates with a receiver 502. The transmitter comprises a modulator 504, which receives as input a signal 506 to be transmitted, consisting of bits in an arrangement according to a preferred embodiment of the invention. The bits are modulated into symbols in the modulator. The symbols are supplied to an encoder 508, whereafter the coded symbols 510 are forwarded via radio frequency parts 512 for transmission e.g. with four antennas 514 to 520. The encoder can be implemented preferably by means of a processor and suitable software or, alternatively, separate components.

Figure 6A:
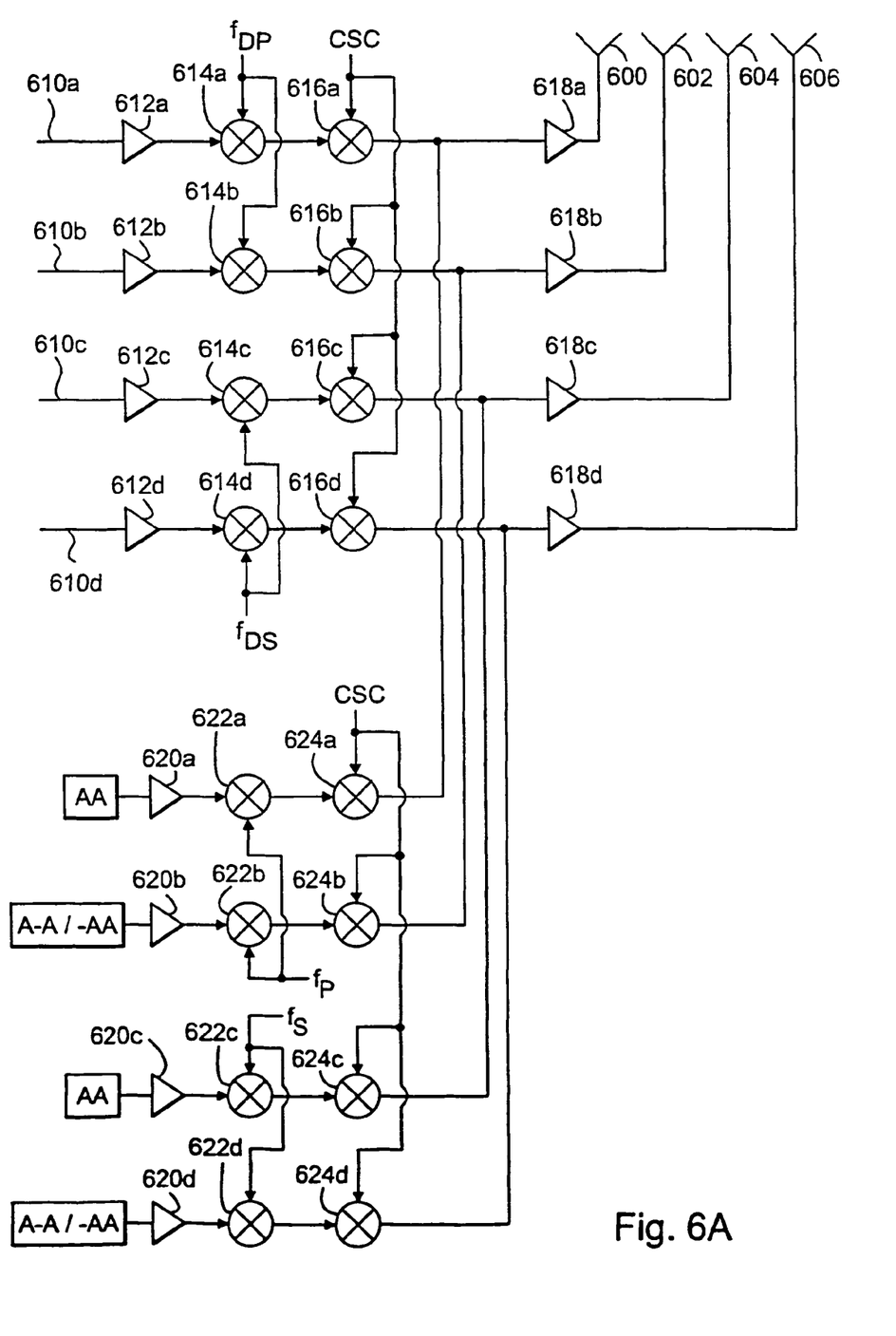
FIG. 6A illustrates an example of an arrangement according to an embodiment of the invention.

Examine below a method according to a preferred embodiment of the invention in a situation shown in FIG. 6A, where a signal is transmitted by means of four transmit antennas 600 to 606 or four beams provided with several transmit antennas. For the sake of simplicity, the example utilizes four transmit antenna paths without restricting the invention thereto, however. Examine first the transmission of a signal and dedicated pilots. The encoder receives as input four signals 610a to 610d intended for four transmit antenna paths, each signal comprising a dedicated pilot and data, and the time slot structure of the signals corresponding to the example shown in FIG. 4C. In this example, the pilot pattern of the dedicated pilot of signal 610a is of the form AA. The pilot pattern of the dedicated pilot of signal 610b is of the form A-A/-AA. The pilot pattern of the dedicated pilot of signal 610c is of the form AA, and the pilot pattern of the dedicated pilot of signal 610d is of the form A-A/-AA. This is only one example of possible distribution of pilot patterns. The signals are first subjected to antenna amplification 612a-612d, excluding the signal pilot fields. Thereafter the power of the dedicated pilots of signals 610a and 610b is adjusted by weighting coefficient $f_{DP}$ in multipliers 614a and 614b. The power of the dedicated pilots of signals 610c and 610d is adjusted by weighting coefficient $f_{DS}$ in multipliers 614c and 614d. The signals are thereafter multiplied by a scrambling code in multipliers 616a to 616d and supplied via RF amplifiers 618a to 618d to the antennas 600 to 606.

In addition to dedicated pilots, common pilot signals are also transmitted as described above. The primary common pilot P-CPICH is transmitted with two radiation patterns (antennas 600 and 602 in the figures) such that the transmission of the first radiation pattern 600 utilizes pilot pattern AA and the transmission of the second radiation pattern 602 utilizes pilot pattern A-A-AA. The pilots are amplified in antenna amplifiers 620a and 620b. During the transmission of the primary pilots, the transmit power is adjusted by coefficient $f_P$ by means of multipliers 622a and 622b. The signals are thereafter multiplied by a scrambling code in multipliers 624a and 624b and supplied via RF amplifiers 618a and 618b to antennas 600 to 602.

The secondary common pilot S-CPICH is transmitted with two radiation patterns (antennas 604 and 606 in the figures) such that the transmission of the first radiation pattern 604 utilizes pilot pattern AA and the transmission of the second radiation pattern 606 utilizes pilot pattern A-A/-AA The pilots are amplified in antenna amplifiers 620c and 620d. During the transmission of the secondary pilot signals, the transmit power is adjusted with coefficient $f_S$ by means of multipliers 622c and 622d. The signals are thereafter multiplied by a scrambling code in multipliers 624c and 624d, and supplied via RF amplifiers 618c and 618d to antennas 604 to 606.

Coefficients $f_P$ and $f_S$ used to adjust the transmit power of the common pilot signals can be different and they can be adjusted irrespective of one another. One factor related to the adjustment is the number of the terminal equipments that are capable of utilizing amplified transmit diversity. In a situation where most of the terminal equipments are not capable of utilizing four-antenna diversity, the ratio of the coefficients should preferably be selected such that $f_P \gg f_S$, i.e. the primary common pilot has a substantially higher transmit power than the secondary common pilot. When there are a high number of equipments utilizing diversity, coefficient $f_S$ is preferably increased.

Coefficients $f_{DP}$ and $f_{DS}$ used to adjust the transmit power of the dedicated pilot signals can be different and they can be adjusted irrespective of one another. In a preferred embodiment of the invention, the dedicated pilots to be transmitted with the same radiation patterns 604, 606 as the secondary common pilot have substantially higher power levels than the dedicated pilots transmitted with the same radiation patterns 600, 602 as the primary common pilot, i.e. $f_{DP} < f_{DS}$.

Figure 6B:
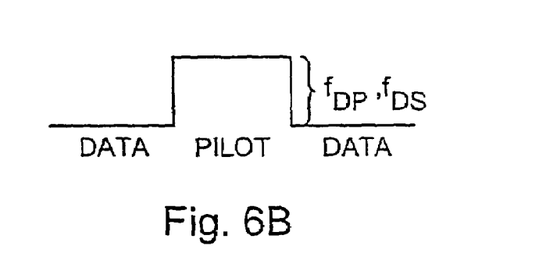
FIG. 6B illustrates weighting of a transmit antenna path over the other paths.

The use of coefficients $f_{DP}$ and $f_{DS}$ is illustrated in FIG. 6B. The coefficients can also be referred to as pilot offset. As described above, a dedicated pilot is transmitted in the same time slot with the user data symbols. The pilot offset illustrates the extent to which the power used in the transmission of the dedicated pilot symbols is higher than the power used in the transmission of data symbols.

Figure 6C:
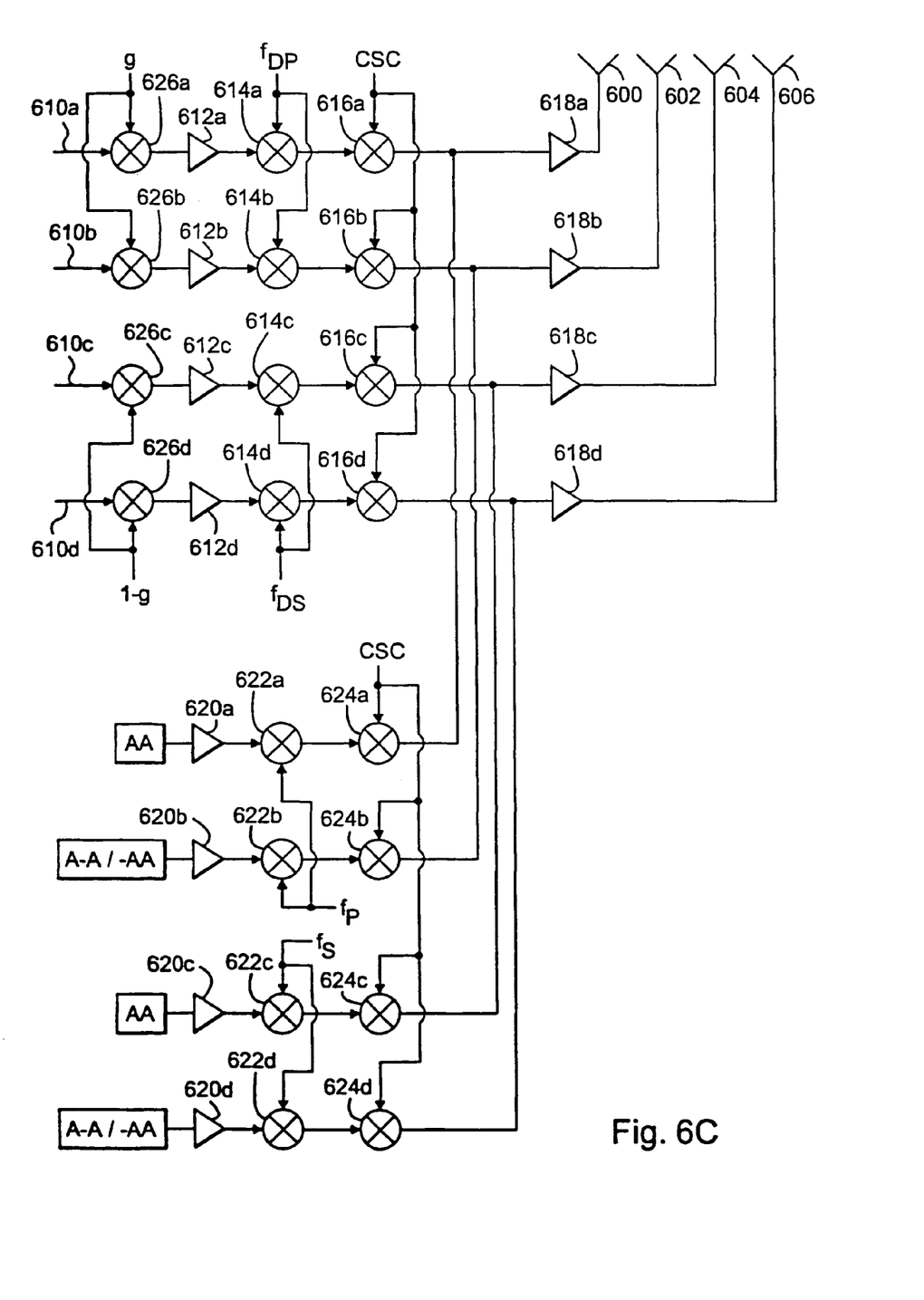
FIG. 6C illustrates another example of an arrangement according to an embodiment of the invention.

In a preferred embodiment of the invention, asymmetrical channel estimation is applied by favouring a signal comprising a primary common pilot in the transmission. Since a primary common pilot is generally transmitted at a rather high transmit power, it also provides a good channel estimate. Such a channel can be favoured by increasing the data transmit power with respect to other channels. This is illustrated in FIG. 6C. The figure shows a transmitter structure that is otherwise similar to the one shown in FIG. 6A, except that the data signals 610a and 610b transmitted from antennas 600 and 602 with the primary common pilot PCPICH are weighted by coefficient g in multipliers 626a, 626b. Correspondingly, the data signals 610c, 610d to be transmitted from antennas 604 and 606 with the secondary common pilot SCPICH are weighted with coefficient 1−g in multipliers 626c, 626d. With the selection of $g > \frac{1}{2}$ it is possible to weight the signal comprising the primary common pilot PCPICH. The arrangement described above and implemented with coefficients is naturally only one example of possible weighting or favouring.

A receiver receiving the signals transmitted with the aforementioned radiation patterns performs various measurements on the received signal. Assume that $f_P \gg f_S$, i.e. the transmit power of the primary common pilot is substantially higher than the transmit power of the secondary common pilot. In the channels transmitted with similar radiation patterns as the secondary common pilot, i.e. the channels where the common pilot has a weak power level, the receiver utilizes dedicated pilots for channel estimation measurements. The dedicated pilots are also used for other measurements. On the channels transmitted with similar radiation patterns as the primary common pilot, i.e. the channels where the common pilot has a high power level, the receiver utilizes dedicated pilots only for other measurements, and channel estimates are obtained from the common pilot.

The aforementioned other measurements preferably include estimation of the signal-to-interference ratio (SIR), measurement of the power ratio between the common pilot signal and the dedicated pilot signal, and verification of feedback modes of transmit diversity. The power ratio between the common pilot signal and the dedicated pilot signal is used for decoding during power control.

The example described above can be generalized to relate universally to transmit diversity. Transmit diversity is generally characterized in that the data transmission utilizes N transmit antenna paths, i.e. parallel data streams or beams provided with a known method, such as N antennas, or an antenna array consisting of several antennas and suitable signal phasing. This transmission, in turn, is based on knowledge of M transmit antenna paths, i.e. data about channel parameters of the M transmit antenna paths.

In an arrangement according to the preferred embodiments of the invention, transmission is based on knowledge of the M transmit antenna paths, where M>2. In the arrangement described above, two channels are used to transmit the primary common pilot PCPICH and the dedicated pilot DPCCH, and the channels thus provide two good channel estimates based on measurements of the PCPICH. The dedicated pilot is used for other measurements described above. Therefore M−2 channel estimates are also needed, and they are obtained by transmitting both the secondary common pilot SCPICH and the dedicated pilot DPCCH on M−2 channels. The transmit power of the pilots is preferably adjusted such that the power of the secondary common pilot is substantially lower than the power of the primary common pilot, and that the power of the dedicated pilot in the channels with the secondary common pilot is higher than in the channels with the primary common pilot. Therefore channel estimation in the channels with the secondary common pilot is carried out based on the dedicated pilot in addition to the other measurements described above.

In certain transmit diversity methods, i.e. closed-loop or feedback modes, transmission is based at least partly on the ancillary information the receiver transmits to the transmitter, this information typically concerning the power ratios of the received channels or advantageous manners of changing the phase of the channels to be transmitted, in order that the channels amplify one another in the reception. In other transmit diversity methods, which are referred to as open-loop modes, the transmitter has no ancillary information in use. Open-loop modes can be based on e.g. space-time coding, orthogonal transmit diversity, delay diversity, phase hopping or a sliding phase shift, or a combination of any of the aforementioned methods, or a combination of the use of partial ancillary information with any of the aforementioned methods. If there is more than one receiving antenna, transmit diversity based on knowledge of M transmit antenna paths can be converted at least partly into a higher coding rate by transmitting at least partly independent data to different transmit antenna paths. An example is disclosed in *Layered-space-time architecture for wireless communication in a fading environment when using multi-element antennas*, by G. J. Foschini (Bell Labs Technical Journal, Autumn 1996, pp 41-59). Examine below an alternative according to a preferred embodiment for implementing more than two transmit antenna paths. A known manner of providing transmit diversity is space-time coding, particularly space-time transmit diversity (STTD) designed for two transmit antennas. Symbols S to be transmitted, which consist of bits, are encoded in blocks of given length, and each block is encoded into a predetermined number of channel symbols according to formula $$C_{Ala} \rightarrow \begin{pmatrix} S_1 & S_2 \\ -S_2^* & S_1^* \end{pmatrix}$$

In the formula, the horizontal lines of the matrix illustrate instants of transmission, such that the upper horizontal line shows the information to be transmitted at instant t and the lower horizontal line shows the information to be transmitted at instant t+T, where T denotes a symbol sequence. Character * denotes a complex conjugate. The vertical lines of the matrix in turn represent the antennas, such that the first vertical line shows the information to be transmitted via antenna 1 and the second vertical line shows the information to be transmitted via antenna 2. However, a complex modulation block code of the type shown in the formula is only valid for a maximum of two antennas. In the above example, symbols S1 and S2 are transmitted at instant t, and symbols −S2* and S1* at instant t+T.

Figure 7A:
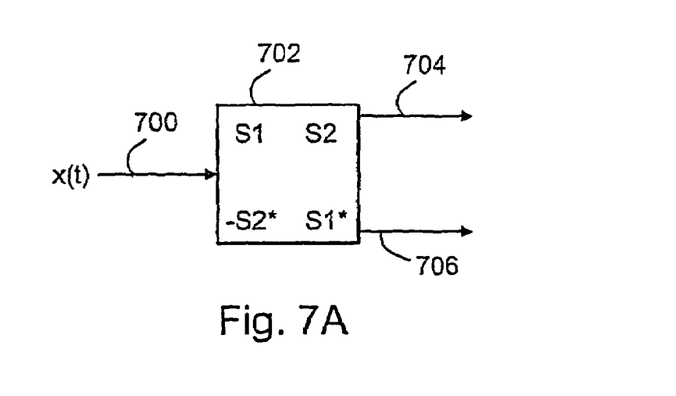
FIGS. 7A to 7C and 8 illustrate an example of an arrangement according to an embodiment of the invention.

Examine FIG. 7A, where a signal x(t) 700 to be transmitted is supplied to an STTD encoder 702, where the signal is subjected to coding according to the aforementioned formula. The encoder output comprises two signals, the first 704 of which includes symbols S1 and S2, and the second 706 comprises symbols −S2* and S1*.

Figure 7B:
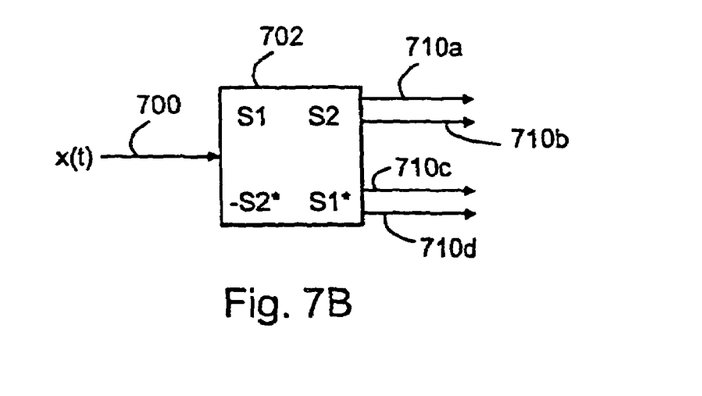
Figure 7C:
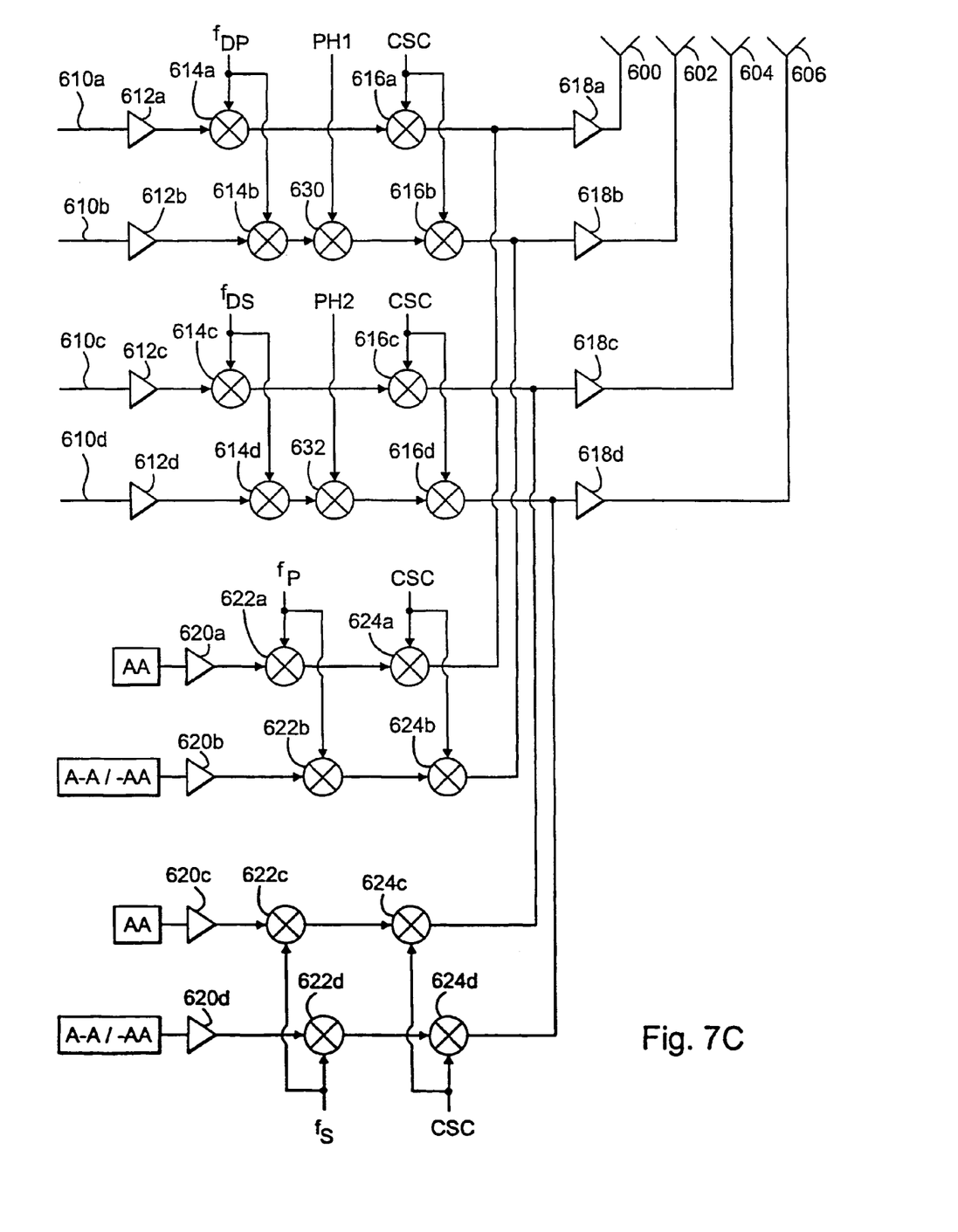

The example can be extended further into four-antenna transmit diversity with the arrangement shown in FIGS. 7B and 7C. In FIG. 7B, the output of the space-time encoder 702 comprises four signals 710a to 710d. Compared to the example shown in FIG. 7A, the output signals are divided into two, such that signals 710a and 710b comprise symbols S1 and S2 corresponding to signal 704 in the example of FIG. 7A. Correspondingly, signals 710c and 710d include symbols −S2* and S1* corresponding to signal 706 in the example shown in FIG. 7A.

Examine FIG. 7C. The encoder receives four signals 610a to 610d as input, the signals being intended for four transmit antenna paths and each signal comprising a dedicated pilot, the time slot structure of the signals corresponding to FIG. 4C. The data in the time slots of signals 610a to 610d consists of signals 710a to 710d shown in FIG. 7B. In this example, the pilot pattern of the dedicated pilot of signal 610a is of the form AA, and the data includes symbols S1S2. The pilot pattern of the dedicated pilot of signal 610b is of the form A-A/-AA, and the data symbols are S1S2. The pilot pattern of the dedicated pilot of signal 610c is AA, and the data includes symbols −S2*S1*. The pilot pattern of the dedicated pilot of signal 610d in turn is A-A/-AA, and the data symbols include −S2*S1*. This is only one example of possible pilot pattern distribution. The time slots can also include other information, such as power control bits.

The signals 610a to 610d including the dedicated data are subjected first to antenna amplification 612a-612d. The power of the dedicated pilots is thereafter adjusted by weighting coefficient $f_{DP}$ in multipliers 614a and 614b. Correspondingly, the power of the dedicated pilots of signals 610c and 610d is adjusted by weighting coefficient $f_{DS}$ in multipliers 614c and 614d. Signal 610a is thereafter multiplied by a scrambling code in multiplier 616a. Signal 610b is supplied from multiplier 614b to a phase shifter 630, where the signal phase is changed by means of phase coefficient PH1. The signal is supplied from the phase shifter 630 to multiplier 616b, where the signal is multiplied by a scrambling code. Correspondingly, signal 610c is multiplied by a scrambling code in multiplier 616a. Signal 610d is supplied from multiplier 614d to a phase shifter 633, where the signal phase is changed by means of phase coefficient PH2. The signal is supplied from the phase shifter 633 to multiplier 616d, where the signal is multiplied by a scrambling code. The signals 610a to 610d are forwarded from the multipliers 616a to 616d via the RF amplifiers 618a to 618d to the antennas 600 to 606.

In addition to dedicated pilots, common pilots are transmitted in this embodiment as well. The primary common pilot P-CPICH is transmitted with two radiation patterns (antennas 600 and 602 in the figures), and the secondary common pilot S-CPICH is transmitted with two radiation patterns (antennas 604 and 606 in the figures). In this respect the arrangement corresponds to FIG. 6A described above.

In this embodiment, the phases of signals 610b and 610d are changed with phase coefficients PH1 and PH2. The coefficients can be for example terms $e^{j\Psi}$ and $e^{j\Phi}$, where $\Psi$ and $\Phi$ are phase terms causing phase rotation. The terms are known both to the transmitter and to the receiver.

Phase coefficients PH1 and PH2 can be periodical or pseudorandom, and they can be equal or different. Phase rotation can be for example {0, 90, 180, 270} in one branch and {180, 270, 0, 90} in the other branch for 4PSK modulation. Another example is {0, 45, 90, 135, 180, 225, 270, 315} for the first branch and {0, 22.5, 45, 67.5, . . . , 337.5} for the second branch for 16 PSK modulation. Thus, the numerical values given here are only exemplary.

In the example shown in FIG. 7C, the phase shift was only directed at signals 610b and 610d comprising data and a dedicated pilot In certain embodiments, phase shifting can also be performed on common pilots, e.g. between multipliers 622b and 624b and correspondingly between multipliers 622d and 624d.

The arrangement described herein thus provides two channels transmitted with the primary common pilot and two channels transmitted with the secondary common pilot. With respect to the transmitter shown in FIG. 5, the components described herein are located in the encoder 508. The transmitter naturally also comprises other components, such as amplifiers and filters, but they are not described herein for the sake of clarity, as will be evident to a person skilled in the art on the basis of the specification.

Examine below the receiver shown in FIG. 5. The transmitter 500 according to the invention thus transmits a signal 520 via three or more antennas. The signal is received in the receiver 502 with an antenna 522 and supplied to radio-frequency parts 524. The number of the antennas in the receiver is not significant for the invention. In the radio-frequency parts the signal is converted into an intermediate frequency or baseband. The converted signal is applied to a channel estimator 526, which forms estimates for the channel through which the signal has propagated. The estimates are formed from the primary common pilot, if the received beam comprises such a pilot, or from the dedicated pilot and the secondary common pilot. The signal is also applied from the radio-frequency parts to a decoder bank 528 comprising a number of decoder units, which decode the coding performed in the encoder 508 at the transmitting end. Since the signal transmitted over the radio path has often propagated via more than one path between the transmitter and the receiver, the received signal comprises several multipath-propagated components. Each decoder unit processes one received signal component. The decoder units receive symbols transmitted in different time slots, on different frequencies or with different scrambling codes, whereafter the symbols are typically stored temporarily in a buffer memory and the original symbols are reconstructed from the estimates by means of the channel estimates. The decoded symbols are supplied from the decoder units to a combiner 530, where signals from the different paths are combined. The combiner can be implemented for example with the rake technique, which utilizes maximum ratio combining. Data about the estimated channel is applied from the channel estimator 526 to the decoder units and the combiner. The channel estimator also performs measurement of the power ratio between the common pilot and the dedicated pilot This is utilized in connection with decoding. The receiver also comprises control means 538 for controlling the operation of different parts of the receiver. The radio-frequency parts 524 can be implemented with known methods.

The signal is supplied from the combiner to a detector 532. The detector detects the symbols by means of known detection methods. For example, It is possible to calculate the Euclidean distance of the combined symbol estimates from possible symbol states, or to determine the a posteriori probabilities of the received symbols or bits. In the latter case, information about the channel is needed, this information 534 being obtained from the channel estimator 526. The signal is supplied from the detector 532 to a channel decoder 536 and further to other parts of the receiver. The means carrying out the operations according to the preferred embodiments of the invention can be implemented both in the transmitter and in the receiver by means of a processor and suitable software, or also with different components, circuits or ASICs.

Figure 8:
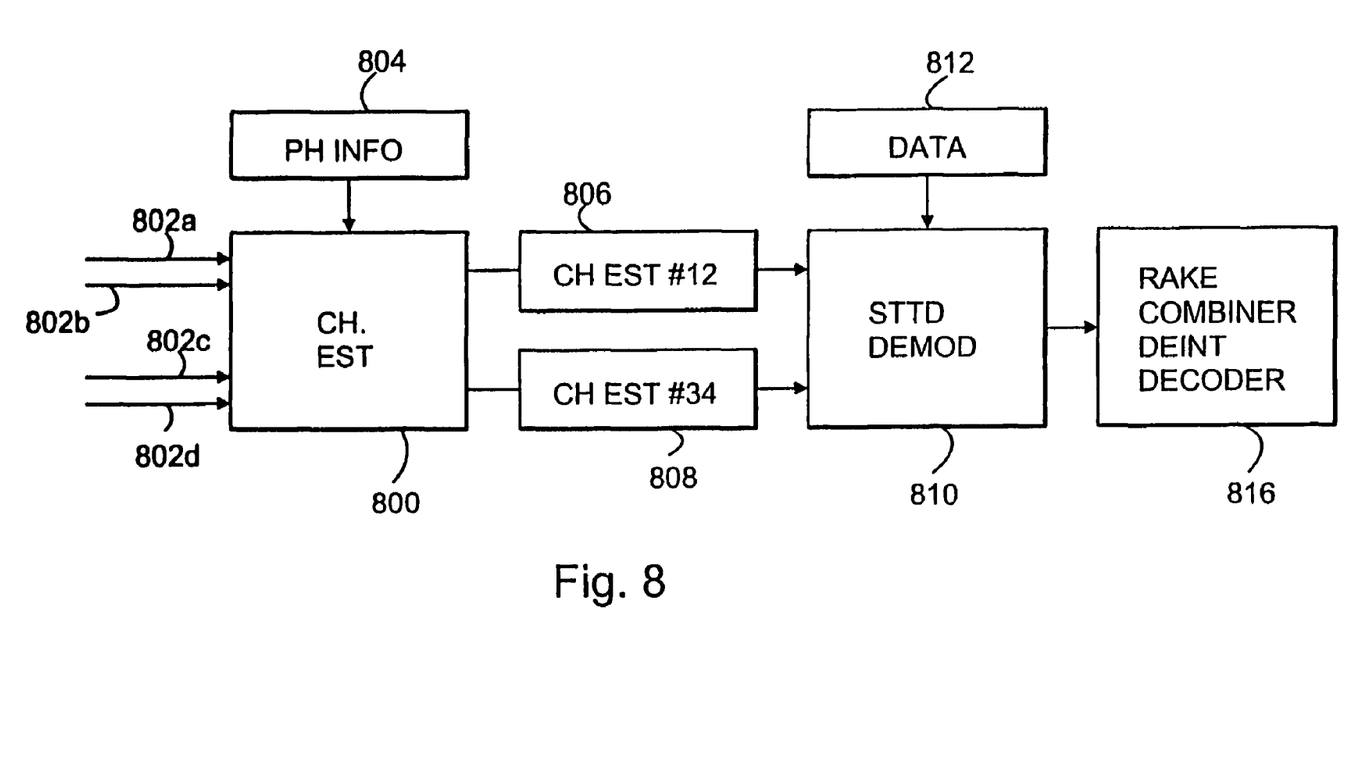

Examine below a simplified example of a partial receiver as shown in FIG. 8. The receiver comprises a channel estimator 800, which obtains pilot signals 802a-802d received from different channels as input. The pilot signals include both common pilots and dedicated pilots. Information about the phase shift 804 used in the transmitter is also received as input in the channel estimator. The channel estimator performs channel estimation by means of averaged low-pass filtration, for example, and provides from its output combined estimates 806 from channels 1 and 2 and estimates 808 from channels 3 and 4. The estimates are formed from the primary common pilot if the received beam comprises such a pilot, or from the dedicated pilot and the secondary common pilot. The channel estimates are supplied to an STTD demodulator 810, which also obtains the received data 812 as input. The demodulator 810 processes the received data on the basis of the channel estimates, providing in its output a demodulated signal, which is applied further to a rake receiver, a combiner, deinterleaving and a decoder 816, the output of the demodulator 810 thus comprising symbols S1 and S2.

Even though the invention is described above with reference to the examples according to the accompanying drawings, it is clear that the invention is not restricted thereto but it can be modified in various manners within the scope of the inventive idea disclosed in the appended claims.

The invention claimed is:

1. A method, comprising:
    transmitting a primary common pilot signal through at most two radiation patterns and a secondary common pilot signal through at least one radiation pattern by adjusting the power ratio between the primary common pilot signal and the secondary common pilot signal and the total power of the primary and the secondary common pilot signals;
    transmitting a dedicated pilot signal with at least one user signal with adjustable transmit power, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals; and
    using the dedicated pilot signals transmitted with the same radiation patterns as the secondary common pilot signal for channel estimation measurements in a receiver.

2. The method according to claim 1, wherein the dedicated pilot signals to be transmitted with the same radiation patterns as the secondary common pilot signal have relatively higher power levels than the dedicated pilot signals to be transmitted with the same radiation patterns as the primary common pilot signal.

3. The method according to claim 1, wherein during reception of a signal transmitted with a radiation pattern including the secondary common pilot signal, channel estimation is carried out on the basis of the dedicated pilot signal and the secondary common pilot signal.

4. The method according to claim 1, wherein during reception of a signal comprising a weak secondary common pilot signal and a strong dedicated pilot signal, channel estimation is carried out on the basis of the dedicated pilot signal and the secondary common pilot signal.

5. The method according to claim 1, wherein the power ratio of the dedicated pilot signals is obtained by transmitting the dedicated pilot signals to different radiation patterns for different periods of time.

6. The method according to claim 1, further comprising:
utilizing, in the signal reception, data about channels formed through three or more beams, the number of the channels being equal to or greater than the number of the channels used in the actual transmission.

7. The method according to claim 1, further comprising:
providing the radiation patterns used to transmit the primary common pilot with greater weighting in the signal transmission than the radiation patterns used to transmit the secondary common pilot.

8. The method according to claim 7, further comprising:
multiplying the signal comprising the primary common pilot with a higher weighting coefficient than the signal comprising the secondary common pilot.

9. The method according to claim 1, further comprising:
receiving, in an encoder of the transmitter, a channel-coded and interleaved symbols to be transmitted:
subjecting the signal to be transmitted to space-time coding in the encoder of the transmitter to obtain a block-coded signal with MXM orthogonal space-time coding:
subjecting at least one of M data streams to phase shifting in the encoder of the transmitter to obtain a phase-shifted data stream corresponding to a non-phase-shifted data stream; and
transmitting each of the M non-phase-shifted data streams and at least one phase-shifted data stream substantially simultaneously via different antennas.

10. The method according to claim 9, wherein the symbols to be transmitted include symbols S1 and S2, the space-time block code includes a 2×2 space-time block code, and the M data streams include symbol stream transmitted at instants t and t+T and symbol stream transmitted at instants t and t+T, where T is a symbol sequence.

11. The method according to claim 1, further comprising:
receiving the symbols to be transmitted in the encoder of the transmitter; and
subjecting the signal to be transmitted to space-time coding in the encoder of the transmitter.

12. The method according to claim 1, further comprising;
receiving the symbols to be transmitted in the encoder of the transmitter; and
subjecting the signal to be transmitted to feedback transmit diversity coding in the encoder of the transmitter, the coding being based at least partly on ancillary information the receiver has transmitted to the transmitter.

13. The method according to claim 1, further comprising:
receiving the symbols to be transmitted in the encoder of the transmitter; and
transmitting at least partly independent data streams to at least three radiation patterns.

14. A method comprising:
transmitting a primary common pilot signal through at most two radiation patterns and a secondary common pilot signal through at least one radiation pattern by adjusting both the power ratio between the primary and the secondary common pilot signal and the total power of the primary and the secondary common pilot signals;
transmitting a dedicated pilot signal with at least one user signal with adjustable transmit power, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals; and carrying out general measurements related to wireless communication, excluding channel estimation of the radiation patterns corresponding to non-primary common pilot channels, through the primary common pilot channels or the primary common pilot channels and the corresponding dedicated channels.

15. The method according to claim 14, wherein the general measurements include signal-to-interference ratio, handover, free mode cell selection and synchronization measurements.

16. An apparatus, comprising:
an antenna array configured to provide three or more radiation antenna patterns;
a primary transmitter configured to transmit a primary common pilot signal with at most two radiation patterns;
a secondary transmitter configured to transmit a secondary common pilot signal with at least one radiation pattern;
an adjusting unit configured to adjust both the power ratio between the primary and the secondary common pilot signal and the total power of the common pilot signals; and
a transmit power adjuster configured to adjust a transmit power of the dedicated pilot signal transmitted with each user signal, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals.

17. The apparatus according to claim 16, further comprising:
a dedicated pilot signal adjuster configured to adjust the transmit power of the dedicated pilot signal transmitted with each user signal, such that the dedicated pilot signals to be transmitted with the same radiation patterns as the secondary common pilot signal have relatively higher power levels than the dedicated pilot signals to be transmitted with the same radiation patterns as the primary common pilot signal.

18. The apparatus according to claim 16, wherein the apparatus is configured to utilize, in the signal reception, data about channels formed through three or more beams, the number of the channels being equal to or greater than the number of the channels used in the actual transmission.

19. The apparatus according to claim 16, further comprising:
a providing unit configured to provide the radiation patterns used to transmit the primary common pilot signal with greater weighting than the radiation patterns used to transmit the secondary common pilot signal.

20. The apparatus according to claim 16, wherein the apparatus is a base station transceiver or a terminal equipment in a cellular radio system.

21. The apparatus according to claim 16, wherein the transmitter comprises a subjecting unit configured to subject the signal to be transmitted to space-time coding to obtain a block-coded signal with MXM orthogonal space-time coding,
a shifting unit configured to shift the phase of each of M data streams to provide a phase-shifted data stream corresponding to a non-phase-shifted data stream, and
a transmitter configured to transmit each non-phase-shifted data stream and phase-shifted data stream substantially simultaneously via different antennas.

22. An apparatus, comprising:
- one or more antennas configured to receive a signal from a transmitter, wherein the signal comprises a primary and a secondard common pilot signal and a dedicated pilot signal;
- a determining unit configured to determine the power level of the received common pilot signals and the power level of the received dedicated pilot signal;
- a subjecting unit configured to subject the received signal to channel estimation: and
- a guiding unit configured to guide the channel estimation to perform estimation on the dedicated pilot signal and the secondary pilot signal during reception of a signal including a weak secondary common pilot signal and a strong dedicated pilot signal.

23. The apparatus according to claim 22, further comprising:
- a determining unit configuerd to determine the power ratio between the common pilot signal and the dedicated pilot signal.

24. The apparatus according to claim 22, wherein the equipment is a terminal equipment or a base station transceiver in a cellular radio system.

25. An apparatus, comprising:
- antenna array means for providing three or more radiation antenna patterns;
- primary transmitting means for transmitting a primary common pilot signal with at most two radiation patterns;
- secondary transmitting means for transmitting a secondary common pilot signal with at least one radiation pattern;
- adjusting means for adjusting both the power ratio between the primary and the secondary common pilot signal and the total power of the common pilot signals; and
- transmit power adjusting means for adjusting a transmit power of the dedicated pilot signal transmitted with each user signal, such that the ratio of the power levels of the dedicated pilot signals transmitted with the same radiation patterns as the secondary common pilot signal to the power of the dedicated pilot signals transmitted with the same radiation patterns as the primary common pilot signal is inversely proportional to the power ratio between the corresponding secondary and primary pilot signals.

26. An apparatus, comprising:
- one or more antennas for receiving a signal from a transmitter, wherein the signal comprises a primary and a secondary common pilot signal and a dedicated pilot signal;
- determining means for determining the power level of the received common pilot signals and the power level of the received dedicated pilot signal;
- subjecting means for subjecting the received signal to channel estimation; and guiding means for guiding the channel estimation to perform estimation on the dedicated pilot signal and the secondary pilot signal during reception of a signal including a weak secondary common pilot signal and a strong dedicated pilot signal.

* * * * *